United States Patent
Gu et al.

(10) Patent No.: US 12,003,109 B2
(45) Date of Patent: Jun. 4, 2024

(54) DIRECT-CURRENT COUPLING HYDROGEN PRODUCTION SYSTEM AND CONTROL METHOD THEREFOR

(71) Applicant: Sungrow Power Supply Co., Ltd., Hefei (CN)

(72) Inventors: Yu Gu, Hefei (CN); Jiangsong Li, Hefei (CN); Jian Guo, Hefei (CN); Jun Xu, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 33 days.

(21) Appl. No.: 17/792,693

(22) PCT Filed: Mar. 8, 2021

(86) PCT No.: PCT/CN2021/079471
§ 371 (c)(1),
(2) Date: Jul. 13, 2022

(87) PCT Pub. No.: WO2021/248946
PCT Pub. Date: Dec. 16, 2021

(65) Prior Publication Data
US 2023/0041986 A1    Feb. 9, 2023

(30) Foreign Application Priority Data

Jun. 12, 2020 (CN) .......................... 202010533744.5

(51) Int. Cl.
*H02J 3/00* (2006.01)
*H02J 3/38* (2006.01)

(52) U.S. Cl.
CPC .......... *H02J 3/381* (2013.01); *H02J 2300/24* (2020.01); *H02J 2300/28* (2020.01)

(58) Field of Classification Search
CPC .... H02J 3/381; H02J 2300/24; H02J 2300/28; H02J 1/106; H02J 1/102; H02J 3/28;
(Continued)

(56) References Cited

U.S. PATENT DOCUMENTS

| 2006/0028025 A1* | 2/2006 | Kikuchi | H02J 3/381 |
| | | | 290/44 |
| 2008/0127646 A1* | 6/2008 | Doland | F03D 9/007 |
| | | | 60/495 |

(Continued)

FOREIGN PATENT DOCUMENTS

| CN | 102959131 A | 3/2013 |
| CN | 106119883 A | 11/2016 |

(Continued)

OTHER PUBLICATIONS

International Search Report and Written Opinion for International Application No. PCT/CN2021/079471, dated Jun. 10, 2021.

*Primary Examiner* — Julio C. Gonzalez
(74) *Attorney, Agent, or Firm* — Wolf, Greenfield & Sacks, P.C.

(57) ABSTRACT

A direct-current coupling hydrogen production system includes at least one electricity generation system and multiple hydrogen production electrolyzer systems. The electricity generation system includes: a controller, N renewable energy systems, multiple conversion systems and a power switching unit. The power switching unit includes N input ports and M output ports. The controller is configured to control the power switching unit to supply the multiple hydrogen production electrolyzer systems through its output ports with electrical energy received through its input ports, or is configured to control the power switching unit to collect electrical energy received through its input ports and to supply the multiple hydrogen production electrolyzer sys- (Continued)

tems through its output ports respectively corresponding to the hydrogen production electrolyzer systems with the collected electrical energy.

15 Claims, 7 Drawing Sheets

(58) Field of Classification Search
CPC . C25B 1/04; Y02E 10/56; Y02E 60/36; Y02E 70/30; Y02P 20/133
See application file for complete search history.

(56) References Cited

U.S. PATENT DOCUMENTS

| | | |
|---|---|---|
| 2013/0093194 A1 | 4/2013 | Barbáchano et al. |
| 2021/0156039 A1* | 5/2021 | Ballantine .............. C25B 15/021 |
| 2021/0363651 A1* | 11/2021 | Seymour ............... H02M 7/219 |

FOREIGN PATENT DOCUMENTS

| | | | |
|---|---|---|---|
| CN | 109004665 A | 12/2018 | |
| CN | 111224426 A | 6/2020 | |
| CN | 111585297 A | 8/2020 | |
| WO | 2006/097494 A1 | 9/2006 | |

\* cited by examiner

DIRECT-CURRENT COUPLING HYDROGEN PRODUCTION SYSTEM AND CONTROL METHOD THEREFOR

This application is a national stage filing under 35 U.S.C. § 371 of International Patent Application Serial No. PCT/CN2021/079471, filed Mar. 8, 2021, which claims priority to Chinese Patent Application No. 202010533744.5, entitled "DIRECT-CURRENT COUPLING HYDROGEN PRODUCTION SYSTEM AND CONTROL METHOD THEREFOR", filed on Jun. 12, 2020 with the China National Intellectual Property Administration. The contents of these applications are incorporated herein by reference in their entireties.

FIELD

The present disclosure relates to the technical field of hydrogen production, and in particular to a direct current coupling hydrogen production system and a method for controlling the direct current coupling hydrogen production system.

BACKGROUND

With increasing prominence of environmental issues, renewable energy sources attract attention, and solar power and wind power develop increasingly. Since the solar power and the wind power have disadvantages of instability and low energy density, the produced electrical energy does not match the electrical energy demanded by a grid. Further, the traditional chemical energy storage has disadvantages such as small capacity and short service life. Therefore, curtailment of solar, wind and electricity is inevitable in many areas, resulting in a serious waste of resources. As a completely pollution-free energy storage medium from production to end use, hydrogen may cooperate with the solar power and the wind power, to compensate for the disadvantages of the solar power and the wind power.

In an actual renewable energy power station system, although the PEM (proton exchange membrane) electrolyzer successfully produces hydrogen at the power fluctuating from 0% to 100%, the technology thereof is not mature and its service life is short currently. In view of this, a lye electrolyzer system is still inevitable for large-scale hydrogen production in the renewable energy power station. However, the lye electrolyzer has limitations of minimum current/voltage. Generally, an actual current of the lye electrolyzer must be greater than about 30% of its rated current. Otherwise, the purity of hydrogen produced by the lye electrolyzer is low, and the lye electrolyzer may automatically shut down and even results in safety hazards.

SUMMARY

In view of this, an object of the present disclosure is to provide a direct-current coupling hydrogen production system and a method for controlling the direct-current coupling hydrogen production system, to solve the problem of low purity of hydrogen produced by a lye electrolyzer due to the fact that the actual current of the lye electrolyzer is extremely small, thereby improving energy utilization and safety of the direct-current coupling hydrogen production system.

A direct-current coupling hydrogen production system is provided according to a first aspect of the present disclosure. The direct-current coupling hydrogen production system includes: at least one electricity generation system and multiple hydrogen production electrolyzer systems. The at least one electricity generation system each includes: a controller, N renewable energy systems, multiple conversion systems and a power switching unit, and N is an integer greater than 1. The multiple conversion systems and the power switching unit each are arranged on an electrical energy transmission path from the N renewable energy systems to M hydrogen production electrolyzer systems, and M is an integer greater than 1. The power switching unit includes N input ports and M output ports. The controller is configured to control the power switching unit to supply the multiple hydrogen production electrolyzer systems through the output ports of the power switching unit respectively corresponding to the multiple hydrogen production electrolyzer systems with electrical energy received through input ports of the power switching unit, or is configured to control the power switching unit to collect electrical energy received through the input ports of the power switching unit and to supply the multiple hydrogen production electrolyzer systems through the output ports of the power switching unit respectively corresponding to the hydrogen production electrolyzer systems with the collected electrical energy, so that the multiple hydrogen production electrolyzer systems that receive the electrical energy each have sufficient power for hydrogen production and operate independently from each other.

Optionally, the multiple conversion systems in each of the at least one electricity generation system are arranged at a front end of the power switching unit, the number of the multiple conversion systems is N, output ports of the N renewable energy systems are connected to input ports of the N conversion systems in one-to-one correspondence, output ports of the N conversion systems are connected to the N input ports of the power switching unit in one-to-one correspondence, and the M output ports of the power switching unit are connected to input ports of the M hydrogen production electrolyzer systems in one-to-one correspondence.

Optionally, the multiple conversion systems in each of the at least one electricity generation system are arranged at a back end of the power switching unit, the number of the multiple conversion systems is M, output ports of the N renewable energy systems are connected to the N input ports of the power switching unit in one-to-one correspondence, the M output ports of the power switching unit are connected to input ports of the M conversion systems in one-to-one correspondence, and output ports of the M conversion systems are connected to input ports of the M hydrogen production electrolyzer systems in one-to-one correspondence.

Optionally, the direct-current coupling hydrogen production system further includes at least one hydrogen storage tank configured to store hydrogen produced by the multiple hydrogen production electrolyzer systems.

Optionally, the multiple hydrogen production electrolyzer systems each are configured to discharge hydrogen at a cathode or an intermediate electrode of the hydrogen production electrolyzer system, and a gas pipeline between the hydrogen storage tank and each of the multiple hydrogen production electrolyzer systems is a metal pipeline or a non-metallic pipeline.

Optionally, the number of the hydrogen storage tank is one, and the multiple hydrogen production electrolyzer systems are configured to share the one hydrogen storage tank to store hydrogen in a centralized manner. Alternatively, the number of the hydrogen storage tank is M, the multiple hydrogen production electrolyzer systems correspond to the M hydrogen storage tanks in one to one correspondence, to store hydrogen in a distributed manner. Alternatively, the number of the hydrogen storage tank is greater than 1 and less than M, some of the multiple hydrogen production electrolyzer systems are configured to share a same hydrogen storage tank. Hydrogen produced by a hydrogen production electrolyzer system among the multiple hydrogen production electrolyzer systems that is connected to one hydrogen storage tank is stored separately from hydrogen produced by a hydrogen production electrolyzer system among the multiple hydrogen production electrolyzer systems that is connected to another hydrogen storage tank.

Optionally, the power switching unit includes at least N-1 bus switch modules and at least M-1 electrolyzer input switch modules. One port of each of the M-1 electrolyzer input switch modules is connected to an output port among the M output ports of the power switching unit, and the other port of the electrolyzer input switch module is connected to an input port among the N input ports of the power switching unit. Each of the bus switch modules is arranged between two input ports among the N input ports of the power switching unit.

Optionally, in a case that hydrogen is discharged at a cathode, a gas pipeline is a metal pipeline, and hydrogen is stored in a centralized manner, each of the M-1 electrolyzer input switch modules includes a controllable switch arranged on an anode branch, and each of the N-1 bus switch modules includes a controllable switch arranged on a positive branch. In a case that hydrogen is discharged at a cathode and a gas pipeline is a non-metal pipeline, or hydrogen is discharged at an immediate electrode, each of the M-1 electrolyzer input switch modules includes a controllable switch arranged on anode branch and a controllable switch arranged on a cathode branch, and each of the N-1 bus switch modules includes a controllable switch arranged on a positive branch and a controllable switch arranged on a negative branch.

Optionally, the controllable switch is a controllable mechanical switch or a semiconductor switch.

Optionally, for each of the N renewable energy systems, the renewable energy system includes a wind power system and/or a solar power system. In a case that the renewable energy system includes the wind power system, a conversion system among the multiple conversion systems that corresponds to the renewable energy system includes an AC/DC converter connected to the wind power system. In a case that the renewable energy system includes the solar power system, a conversion system among the multiple conversion systems that corresponds to the renewable energy system includes a DC/DC converter connected to the solar power system.

Optionally, the solar power system includes a photovoltaic module and a direct-current combiner box, one port of the direct-current combiner box is connected to an output port of the photovoltaic module, and the other port of the direct-current combiner box serves as an output port of the solar power system. The wind power system includes a blade and a permanent magnet synchronous generator or doubly fed induction generator, an output port of the blade is connected to one port of the permanent magnet synchronous generator or doubly fed induction generator, and the other port of the permanent magnet synchronous generator or doubly fed induction generator serves as an output port of the wind power system.

Optionally, the controller is a communication host in each of the multiple conversion systems. Alternatively, the controller is a system controller independently arranged in the direct-current coupling hydrogen production system.

A method for controlling a direct-current coupling hydrogen production system is provided according to a second aspect of the present disclosure. The method is applied to a controller of the direct-current coupling hydrogen production system disclosed according to the first aspect of the present disclosure. The method includes: acquiring a maximum power point tracking MPPT value of each conversion system in the direct-current coupling hydrogen production system; determining a to-be-operated hydrogen production electrolyzer system based on all the MPPT values and a minimum startup electrical parameter of a hydrogen production electrolyzer system in the direct-current coupling hydrogen production system; and controlling the power switching unit in the direct-current coupling hydrogen production system to supply electrical energy to the to-be-operated hydrogen production electrolyzer system for hydrogen production, so that electrical energy received by each to-be-operated hydrogen production electrolyzer system is sufficient for hydrogen production, and all the to-be-operated hydrogen production electrolyzer system operates independently.

Optionally, the power switching unit includes at least M-1 electrolyzer input switch modules and at least N-1 bus switch modules, and the controlling the power switching unit in the direct-current coupling hydrogen production system to supply electrical energy to the to-be-operated hydrogen production electrolyzer system for hydrogen production, so that electrical energy received by each to-be-operated hydrogen production electrolyzer system is sufficient for hydrogen production, and all the to-be-operated hydrogen production electrolyzer system operates independently includes: controlling a bus switch module and an electrolyzer input switch module in the power switching unit to be turned on to connect an input port to an output port of the power switching unit so that all the to-be-operated hydrogen production electrolyzer system operates independently.

Optionally, the controlling a bus switch module and an electrolyzer input switch module in the power switching unit to be turned on to connect an input port to an output port of the power switching unit so that all the to-be-operated hydrogen production electrolyzer system operates independently includes: controlling, in a case that the number of the to-be-operated hydrogen production electrolyzer system is 1, all bus switch modules and an electrolyzer input switch module that is connected to the to-be-operated hydrogen production electrolyzer system to be turned on, and all other electrolyzer input switch modules to be turned off, so that all input ports of the power switching unit each are connected to the output port of the power switching unit, and the to-be-operated hydrogen production electrolyzer system operates independently; and controlling, for each to-be-operated hydrogen production electrolyzer system in a case that the number of the to-be-operated hydrogen production electrolyzer system is greater than 1, a bus switch module and an electrolyzer input switch module in a path for supplying electrical energy to the to-be-operated hydrogen production electrolyzer system to be turned on, and a bus switch module between paths to be turned off, so that an input port is connected to an output port of the power switching unit, and the to-be-operated hydrogen production electrolyzer systems operate independently from each other.

It can be seen from the above technical solutions that, the direct-current coupling hydrogen production system according to the present disclosure includes: at least one electricity generation system and multiple hydrogen production electrolyzer systems. In each of the at least one electricity generation system, multiple conversion systems and a power switching unit each are arranged on an electrical energy transmission path from the N renewable energy systems to M hydrogen production electrolyzer systems, and M is an integer greater than 1. The power switching unit includes N input ports and M output ports. The controller is configured to control the power switching unit to supply the multiple hydrogen production electrolyzer systems through the output ports of the power switching unit respectively corresponding to the multiple hydrogen production electrolyzer systems with electrical energy received through input ports of the power switching unit, or is configured to control the power switching unit to collect electrical energy received through the input ports of the power switching unit and to supply the multiple hydrogen production electrolyzer systems through the output ports of the power switching unit respectively corresponding to the hydrogen production electrolyzer systems with the collected electrical energy, so that the multiple hydrogen production electrolyzer systems that receive the electrical energy each have sufficient power for hydrogen production and operate independently from each other. In a case that electrical energy of a single renewable energy system is insufficient to produce hydrogen by a single hydrogen production electrolyzer system, the power switching unit collects electrical energy of multiple renewable energy systems and outputs the collected electrical energy to the hydrogen production electrolyzer system for supplying power for the hydrogen production electrolyzer system, so that the power for hydrogen production by the hydrogen production electrolyzer system that receives the electrical energy is sufficient. Further, the hydrogen production electrolyzer systems that receive the electrical energy operate independently from each other. Therefore, the problem of lower purity of hydrogen produced by the hydrogen production electrolyzer system due to the fact that the actual current of the hydrogen production electrolyzer system is extremely small and the problem of circulation due to the fact that hydrogen production electrolyzer systems that receive electrical energy are not independent of each other are solved, thereby improving the energy utilization and safety of the direct-current coupling hydrogen production system.

DETAILED DESCRIPTION OF EMBODIMENTS

The technical solutions in the embodiments of the present disclosure are described clearly and completely in conjunction with the drawings of the embodiments of the present disclosure hereinafter, so that the objects, technical solutions and advantages of the embodiments of the present disclosure are clearer. It is apparent that the described embodiments are only some rather than all embodiments of the present disclosure. All other embodiments obtained by those skilled in the art based on the embodiments of the present disclosure without any creative efforts fall within the protection scope of the present disclosure.

In this specification, terms "comprise", "include", or any other variants thereof are intended to encompass a non-exclusive inclusion, such that a process, method, article, or device including a series of elements includes not only those elements but also other elements that are not explicitly listed, or includes the elements that are inherent to the process, method, article, or device. Unless expressively limited otherwise, a process, method, article or device limited by "comprising/including a(n) . . . " does not exclude existence of another identical element in the process, method, article or device.

A direct-current coupling hydrogen production system is provided according to the embodiments of the present disclosure, so as to solve the problem of low purity of hydrogen produced by a hydrogen production electrolyzer system due to the fact that an actual current of the hydrogen production electrolyzer system is extremely small in the conventional technology, thereby improving energy utilization and safety of the direct-current coupling hydrogen production system.

Figure 1:
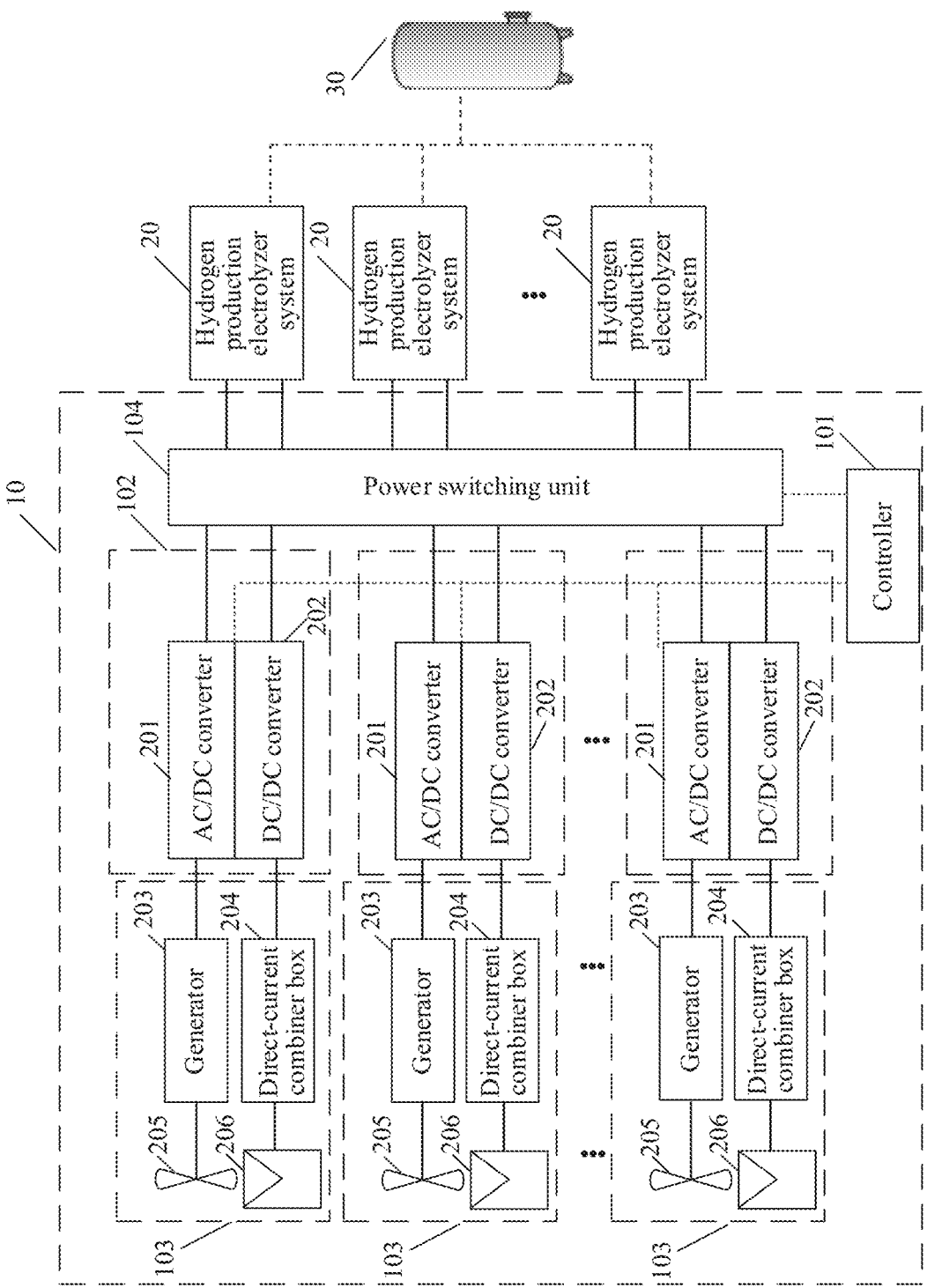
FIG. 1 is a schematic diagram illustrating a direct-current coupling hydrogen production system according to an embodiment of the present disclosure.

Referring to FIG. 1, the direct-current coupling hydrogen production system includes: at least one electricity generation system 10 (where FIG. 1 merely shows an example in which the direct-current coupling hydrogen production system includes one electricity generation system 10), multiple hydrogen production electrolyzer systems 20 and at least one hydrogen storage tank 30. The electricity generation system 10 includes: a controller 101, N renewable energy systems 103, multiple conversion systems 102 and a power switching unit 104. N is an integer greater than 1. The hydrogen storage tank 30 is connected to a hydrogen outlet of a hydrogen production electrolyzer system 20 corresponding to the hydrogen storage tank 30 via a gas pipeline. Each of the hydrogen production electrolyzer system 20 outputs the produced hydrogen to the hydrogen storage tank 30 through the gas pipeline. The hydrogen storage tank 30 stores the hydrogen produced by the hydrogen production electrolyzer system 20. The hydrogen production electrolyzer system 20 is a lye hydrogen production electrolyzer system 20. Alternatively, the hydrogen production electrolyzer system 20 is another system, for example, a PEM (proton exchange membrane) hydrogen production electrolyzer system or a solid oxide hydrogen production electrolyzer system, depending on the actual applications, which is not limited herein and falls within the protection scope of the present disclosure.

In practice, in a case that the number of the hydrogen storage tank 30 is one, all the multiple hydrogen production electrolyzer systems 20 share the hydrogen storage tank 30, to store hydrogen in a centralized manner. That is, respective hydrogen outlets of all the multiple hydrogen production electrolyzer systems 20 each are connected to a gas inlet of the hydrogen storage tank 30 via a gas pipeline. In a case that the number of the hydrogen storage tank 30 is M, the multiple hydrogen production electrolyzer systems 20 are in one to one correspondence with the M hydrogen storage tanks 30, to store hydrogen in a distributed manner. That is, the hydrogen outlet of each of the hydrogen production electrolyzer systems is connected to a gas inlet of the hydrogen storage tank 30 corresponding to the hydrogen production electrolyzer system 20 via a gas pipeline. In a case that the number of the hydrogen storage tank 30 is greater than 1 and less than M, some of the multiple hydrogen production electrolyzer systems 20 share the same hydrogen storage tank 30, to store hydrogen in a centralized manner. Hydrogen produced by a hydrogen production electrolyzer system 20 connected to one hydrogen storage tank 30 is stored separately from hydrogen produced by a hydrogen production electrolyzer system 20 connected to another hydrogen storage tank 30. That is, respective hydrogen outlets of the some of the multiple hydrogen production electrolyzer systems 20 each are connected to a hydrogen inlet of the same hydrogen storage tank 30 via gas pipelines. For example, M is equal to five and the number of the hydrogen storage tanks 30 is two. Two of the five hydrogen production electrolyzer systems 20 share one of the two hydrogen storage tanks 30, and the other three hydrogen production electrolyzer systems 20 share the other of the two hydrogen storage tanks, which is not described in detail herein. Details in the case that the number of the hydrogen storage tank 30 is greater than 1 and less than M depend on the actual applications, and fall within the protection scope of the present application.

Figure 2:
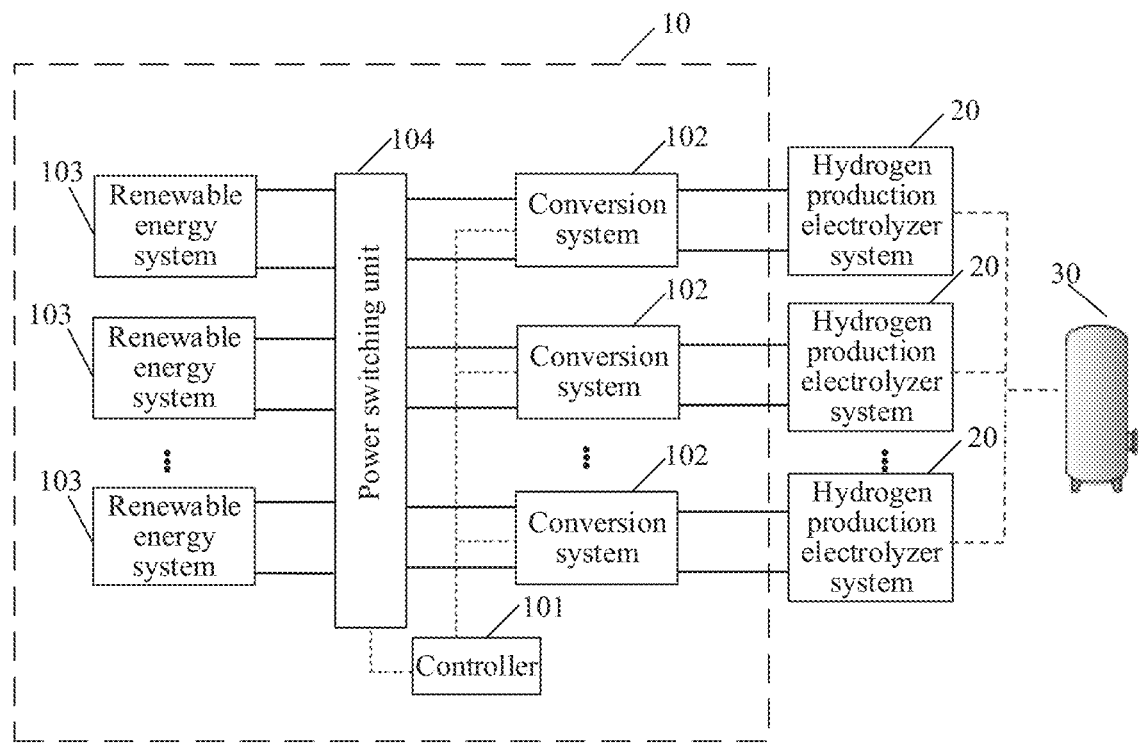
FIG. 2 is a schematic diagram illustrating the direct-current coupling hydrogen production system according to another embodiment of the present disclosure.

As shown in FIGS. 1 and 2, the conversion system 102 and the power switching unit 104 both are arranged on an electrical energy transmission path from the N renewable energy systems 103 to the M hydrogen production electrolyzer systems 20. M is an integer greater than 1, and may be equal to N. It should be noted that in a case that the direct-current coupling hydrogen production system includes only one electricity generation system 10, the number of the hydrogen production electrolyzer system 20 is only M. In a case that the direct-current coupling hydrogen production system includes multiple electricity generation systems 10, each of the multiple electricity generation systems 10 is connected to M hydrogen production electrolyzer systems 20. In addition, the value of M may vary from electricity generation system 10 to electricity generation system 10, which depends on actual applications. In each electricity generation system 10, the power switching unit 104 includes N input ports and M output ports.

As shown in FIG. 1, the electricity generation system 10 includes N conversion systems 102. Electrical energy from the N renewable energy systems 103 is outputted to the M hydrogen production electrolyzer systems 20 through respective conversion systems 102 and the power switching unit 104 sequentially. That is, the N conversion systems 102 are arranged at the front end of the power switching unit 104. In this case, the power switching unit 104 collects the electrical energy inputted through the N input ports from the N renewable energy systems 103 connected to the N conversion systems 102 respectively, and then outputs the collected electrical energy to the M hydrogen production electrolyzer systems through the M output ports.

Alternatively, as shown in FIG. 2, the electricity generation system 10 includes M conversion systems 102. Electrical energy from the N renewable energy systems 103 is outputted to the M hydrogen production electrolyzer systems 20 through the power switching unit 104 and the M conversion systems 102 sequentially, where the M hydrogen production electrolyzer systems 20 are in one-to-one correspondence with the M conversion systems 102. That is, the M conversion systems 102 are arranged at the back end of the power switching unit 104. In this case, the power switching unit 104 collects the electrical energy from the N renewable energy systems 103 respectively connected to the N input ports, and then outputs the collected electrical energy to the M hydrogen production electrolyzer systems 20 through the M output ports and the M conversion systems 102, respectively.

In both the case that the conversion system 102 is arranged at the front end of the power switching unit 104 and the case that the conversion system 102 is arranged at the back end of the power switching unit 104 in the electricity generation system 10, the controller 101 is configured to: control the power switching unit 104 to supply the hydrogen production electrolyzer systems 20 through its output ports respectively corresponding to the hydrogen production electrolyzer systems 20 with the electrical energy received through its input ports, or collect the electrical energy received through its input ports and then supply the hydrogen production electrolyzer systems 20 through its output ports respectively corresponding to the hydrogen production electrolyzer systems 20 with the collected electrical energy, so that the hydrogen production electrolyzer systems 20 that receive the electrical energy each have sufficient power for hydrogen production, and the hydrogen production electrolyzer systems that receive the electrical energy operate independently from each other.

In practice, the controller 101 may be a communication host in each conversion system 102, or a system controller independently arranged in the direct-current coupling hydrogen production system, which is not limited herein. All technical solutions that the controller 101 is capable of communicating with and exchanging information with each of the conversion systems 102, determining the number of the to-be-powered hydrogen production electrolyzer systems 20 based on power detection, and controlling an on-off state of a switch device inside the power switching unit 104 fall within the protection scope of the present application.

With the direct-current coupling hydrogen production system according to this embodiment, in a case that electrical energy of a single renewable energy system 103 is insufficient to produce hydrogen by a single hydrogen production electrolyzer system 20, the power switching unit 104 collects electrical energy of multiple renewable energy systems 103 and outputs the collected electrical energy to the hydrogen production electrolyzer system 20 for supplying power for the hydrogen production electrolyzer system 20, so that the power for hydrogen production by the hydrogen production electrolyzer system 20 that receives the electrical energy is sufficient. Further, the hydrogen production electrolyzer systems that receive the electrical energy operate independently from each other. Therefore, the problem of lower purity of hydrogen produced by the hydrogen production electrolyzer system 20 due to the fact that the actual current of the hydrogen production electrolyzer system 20 is extremely small and the problem of circulation due to the fact that hydrogen production electrolyzer systems that receive electrical energy are not independent of each other are solved, thereby improving the energy utilization and safety of the direct-current coupling hydrogen production system. In addition, the direct-current coupling hydrogen production system is appliable to distributed, centralized and other hydrogen production systems, and is also appliable to various scenarios such as roofs of residential buildings, roofs of industrial and commercial buildings, hills, deserts, and solar-fishery hybrid plants. The direct-current coupling hydrogen production system has a simple structure and strong versatility.

It can be seen from the above description that in the electricity generation system 10, the conversion system 102 is arranged at the front end of the power switching unit 104 in one example, and is arranged at the back end of the power switching unit 104 in another example. Structures in the two examples are described in detail below.

(1) As shown in FIG. 1, in the electricity generation system 10, the conversion system 102 is arranged at the front end of the power switching unit 104. The number of conversion systems 102 is N. Output ports of the N renewable energy systems 103 are connected to input ports of the N conversion systems 102 in one-to-one correspondence. Output ports of the N conversion systems 102 are connected to the N input ports of the power switching unit 104 in one-to-one correspondence. The M output ports of the power switching unit 104 are connected to input ports of the M hydrogen production electrolyzer systems 20 in one-to-one correspondence.

(2) As shown in FIG. 2, in the electricity generation system 10, the conversion system 102 is arranged at the back end of the power switching unit 104. The number of the conversion systems 102 is M. Output ports of the N renewable energy systems 103 are connected to the N input ports of the power switching unit 104 in one-to-one correspondence. The M output ports of the power switching unit 104 are connected to input ports of the M conversion systems 102 in one-to-one correspondence. Output ports of the M conversion systems 102 are connected to input ports of the M hydrogen production electrolyzer systems in one-to-one correspondence.

In practice, the renewable energy system 103 includes a wind power system and/or a solar power system. FIG. 1 shows an example in which the renewable energy system 103 includes both the wind power system and the solar power system. In a case that the renewable energy system 103 includes a wind power system, the conversion system 102 includes an AC/DC converter 201 connected to the wind power system. In a case that the renewable energy system 103 includes a solar power system, the conversion system 102 includes a DC/DC converter 202 connected to the solar power system.

Referring to FIG. 1, the solar power system includes a photovoltaic module 206 and a direct-current combiner box 204. One port of the direct-current combiner box 204 is connected to an output port of the photovoltaic module 206, and the other port of the direct-current combiner box 204 serves as an output port of the solar power system and is connected to an port of the DC/DC converter 202. The other port of the DC/DC converter 202 is connected to an input port of the power switching unit 104 corresponding to the DC/DC converter 202. The wind power system includes: a blade 205 and a generator 203. An output port of the blade 205 is connected to one port of the generator 203. The other port of the generator 203 serves as an output port of the wind power system, and is connected to an alternate-current end of the AC/DC converter 201. A direct-current end of the AC/DC converter 201 is connected to an input port of the power switching unit 104 corresponding to the AC/DC converter 201. The generator 203 is a permanent magnet synchronous generator or a doubly fed induction generator.

Each of the DC/DC converter 202 and the AC/DC converter 201 may have an isolated or non-isolated topology, a boost, buck or boost-buck topology, a resonant or non-resonant topology, a full-bridge or half-bridge structure, a two-level topology or three-level topology. The structures of the DC/DC converter 202 and the AC/DC converter 201 depend on the actual applications and are not limited herein. All appropriate structures fall within the protection scope of the present application. The renewable energy system is not limited to the solar power system and/or the wind power system, and other kinds of the renewable energy system are also within the protection scope of the present disclosure.

Figure 3:
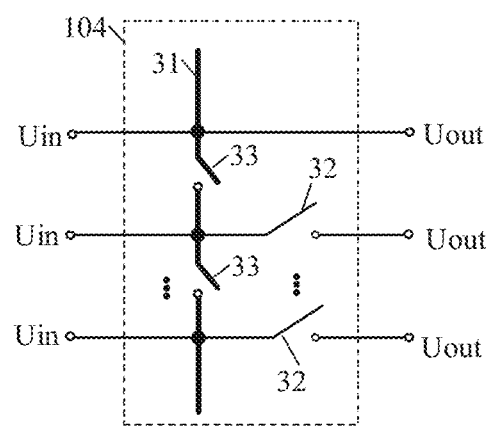
FIG. 3 is a schematic diagram illustrating a power switching unit in the direct-current coupling hydrogen production system according to an embodiment of the present disclosure.

Optionally, referring to FIG. 3, the power switching unit 104 in any of the above embodiments includes at least N-1 bus switch modules 33 and at least M-1 electrolyzer input switch modules 32.

One port of each electrolyzer input switch module 32 is connected to an output port Uout of the power switching unit 104 corresponding to the electrolyzer input switch module 32, and the other port of the electrolyzer input switch module 32 is connected to an input port Uin of the power switching unit 104 corresponding to the electrolyzer input switch module 32. Each bus switch module 33 is arranged between two input ports Uin.

The bus switch module 33 may be arranged between two adjacent input ports Uin. Alternatively, the bus switch module 33 is arranged between two non-adjacent input ports Uin. For example, the power switching unit 104 includes 3 input ports Uin, namely, Uin1, Uin2, and Uin3 in sequence. One bus switch module 33 is arranged between Uin1 and Uin2, and another bus switch module 33 is arranged between Uin2 and Uin3, for the power switching unit 104 to allocate the electrical energy from the renewable energy systems 103 connected to Uin1 and Uin2 directly or via respective conversion systems 102, and electrical energy from the renewable energy systems 103 connected to Uin2 and Uin3 directly or via respective conversion systems 102. The bus switch module 33 may also be arranged between two input ports Uin that are not adjacent to each other. That is, the bus switch module 33 may be arranged between Uin1 and Uin3, for the power switching unit 104 to allocate the electrical energy from the renewable energy systems 103 connected to Uin1 and Uin3 directly or via respective conversion systems 102. The arrangement of bus switch modules 33 depends on the actual applications and is not described in detail herein, and all appropriate arrangements fall within the protection scope of the present application.

Specifically, the power switching unit 104 starts outputting electrical energy to the hydrogen production electrolyzer system 20 by turning on the electrolyzer input switch module 32, and stops outputting electrical energy to the hydrogen production electrolyzer system 20 by turning off the electrolyzer input switch module 32. In practice, since the electrical energy of the N renewable energy systems 103 is generally sufficient for hydrogen production by a single hydrogen production electrolyzer system 20, one output port Uout of the power switching unit 104 is directly connected to one input port Uin of the power switching unit 104, and thus the power switching unit 104 includes only M-1 electrolyzer input switch modules 32. Alternatively, the M output ports Uout each may be connected to a corresponding input port Uin, which is not limited herein and falls within the protection scope of the present disclosure. It should be noted that, in a case that the number of output ports of the power switching unit 104 is greater than the number of input ports of the power switching unit 104, that is, M>N, one input port Uin may be connected to multiple electrolyzer input switch modules 32. In order to avoid circulation between electrolyzer hydrogen production systems due to parallel connection, a case that two or more among the multiple electrolyzer input switch modules 32 sharing the same input port Uin are on simultaneously must be prevented when there is electrical energy inputted into the input port Uin.

That is, the power switching unit 104 may collect electrical energy from all the renewable energy systems 103 to provide electrical energy for only one hydrogen production electrolyzer system 20. Alternatively, the power switching unit 104 collects electrical energy from one or more of the renewable energy systems 103 to provide electrical energy for one hydrogen production electrolyzer system 20. In this case, the bus switch module 33 between paths for supplying electrical energy to respective hydrogen production electrolyzer systems remains open, so that the hydrogen production electrolyzer systems 20 operate independently from each other, thereby avoiding circulation between the electrolyzer hydrogen production systems 20 receiving electrical energy. In a case of M=N, the N renewable energy systems 103 supply electrical energy to the M hydrogen production electrolyzer systems 20 separately.

It should be noted that, in the case that the conversion system 102 is arranged at the back end of the power switching unit 104 as shown in FIG. 2 and the power switching unit 104 includes only one collection bus including at least N-1 bus switch modules 31, the renewable energy system 103 includes only one of the wind power system and the solar power system. Accordingly, the conversion system 102 includes only one of the DC/DC converter 202 and the AC/DC converter 201. That is, in a case that the renewable energy system 103 is a wind power system, the conversion system 102 is an AC/DC converter 201. In a case that the renewable energy system 103 is a solar power system, the conversion system 102 is a DC/DC converter 202. In a case that the power switching unit 104 includes two collection buses 31 each including at least N-1 bus switch modules, the renewable energy system 103 includes both the wind power system and the solar power system. Electrical energy from the wind power system and the solar power system are collected through the two collection buses 31, respectively.

It should be noted that according to the conventional technology multiple small-capacity lye electrolyzers are connected in parallel through switches, and operation of each small-capacity lye electrolyzer is controlled based on power distribution. In this case, the multiple small-capacity lye electrolyzers are directly connected in parallel. A difference in temperature between small-capacity lye electrolyzers may result in a mismatch of the voltage/current between the small-capacity lye electrolyzers. In this case, circulation may occur between the small-capacity lye electrolyzers, resulting in low reliability of the system and even safety accidents.

In this embodiment, each bus switch module 33 in the power switching unit 104 is arranged between a joint where one input port Uin is connected to the collection bus 31 and another joint where another input port Uin is connected to the collection bus 31, so that electrical energy from the N renewable energy systems 103 are collected as required. In addition, electrical energy supplied to one hydrogen production electrolyzer system 20 connected to one end of a bus switch module 33 is independent of electrical energy supplied to another hydrogen production electrolyzer system 20 connected to the other end of the bus switch module 33 by closing the bus switch module 33. That is, the power switching unit 104 selectively collects electrical energy supplied to the hydrogen production electrolyzer systems 20, so that the parallel connection between the hydrogen production electrolyzer systems 20 is controllable. That is, the hydrogen production electrolyzer systems 20 are not directly connected in parallel. Furthermore, the mismatch of voltage/current between the hydrogen production electrolyzer systems 20 does not affect the operation of the direct-current coupling hydrogen production system, which further improves the reliability and safety of the direct-current coupling hydrogen production system. In practice, there is a case that multiple electrolyzer hydrogen production systems 20 are directly connected in parallel to the collection bus 31 to receive the same electrical energy. In this case, circulation may occur between the hydrogen production electrolyzer systems 20 receiving the electrical energy.

In practice, each hydrogen production electrolyzer system 20 discharges hydrogen at its cathode or intermediate electrode, depending on the actual applications, which is not limited herein and falls within the protection scope of the present disclosure. A gas pipeline between the hydrogen storage tank 30 and the hydrogen production electrolyzer system 20 is a metal pipeline or a non-metallic pipeline. The material of the gas pipeline depends on the actual applications, and thus is not limited herein and falls within the protection scope of the present disclosure. The hydrogen may be stored in a centralized or decentralized manner, depending on the actual applications, which is not limited herein and falls within the protection scope of the present disclosure.

A structure of the electrolyzer input switch module 32 and a structure of the bus switch module 33 in the power switching unit 104 shown in FIG. 3 vary with the manner in which the direct current coupling hydrogen production system discharges hydrogen, the material of the gas pipeline and the manner in which the hydrogen is stored, which is described below in detail.

Figure 4:
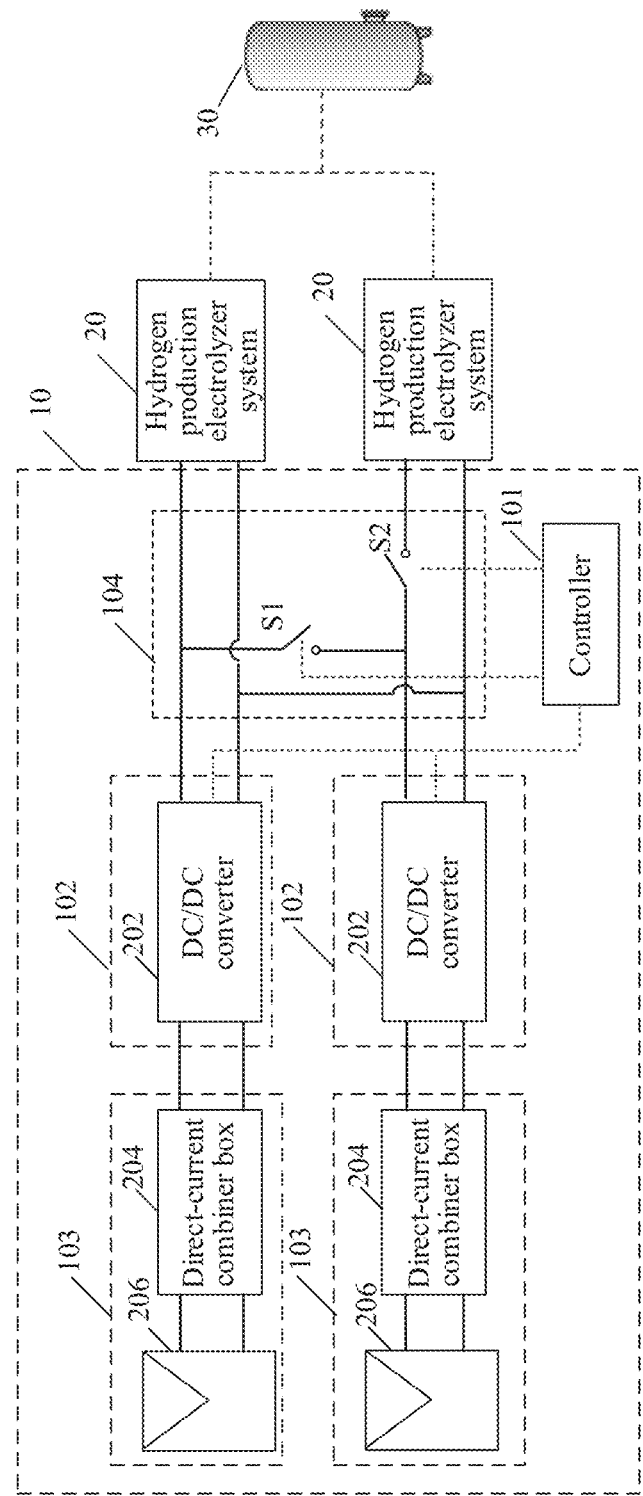
FIG. 4 is a schematic diagram illustrating the direct-current coupling hydrogen production system according to another embodiment of the present disclosure.

(1) The hydrogen production electrolyzer system 20 discharges hydrogen at its cathode, the gas pipeline is a metal pipeline, and the hydrogen is stored in the centralized manner. As shown in FIG. 4 (which illustrates an example in which the renewable energy system 103 includes only the solar power system, the number of the renewable energy systems 103 is 2, and the conversion system 102 is arranged at the front end of the power switching unit 104), each electrolyzer input switch module 32 includes a controllable switch (S2 shown in FIG. 4) arranged on a branch of an anode, and each bus switch module 33 includes a controllable switch (S1 shown in FIG. 4) arranged on a positive branch of the collection bus. The cathodes at the input ends of all the hydrogen production electrolyzer systems 20 are equipotential.

As shown in FIG. 4, in the case that the number of the hydrogen production electrolyzer systems 20 is two, a controllable switch S2 is arranged between an anode at an input end of one hydrogen production electrolyzer system 20 and the positive branch of the collection bus (31 in FIG. 3), and a controllable switch S1 is arranged, on the positive branch of the collection bus, between a positive electrode at an output end of one DC/DC converter 202 and a positive electrode at an output end of the other DC/DC converter 202. No controllable switch is arranged between a cathode at the input end of each hydrogen production electrolyzer system 20 and the negative branch of the collection bus, and no controllable switch is arranged on the negative branch of the collection bus. It should be noted that a controllable switch may also be arranged between an anode at an input end of the other hydrogen production electrolyzer system 20 and the positive branch of the collection bus.

Figure 5:
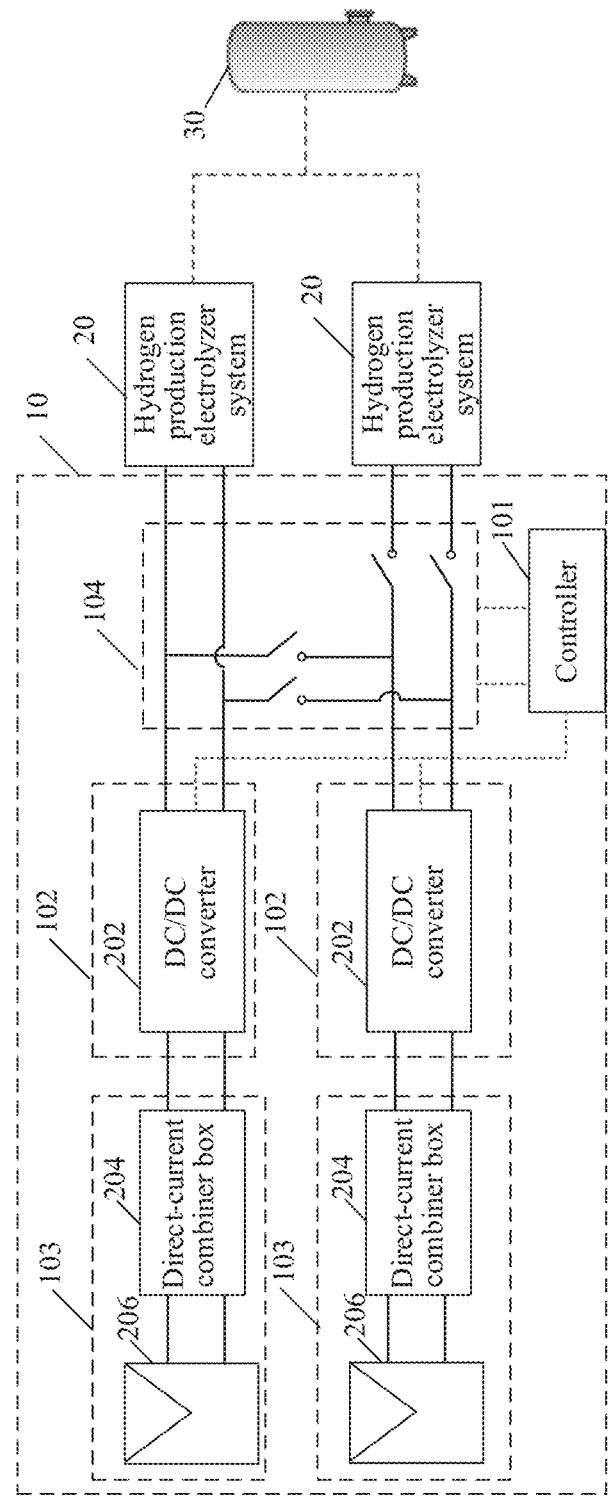
FIG. 5 is a schematic diagram illustrating the direct-current coupling hydrogen production system according to another embodiment of the present disclosure.
Figure 6:
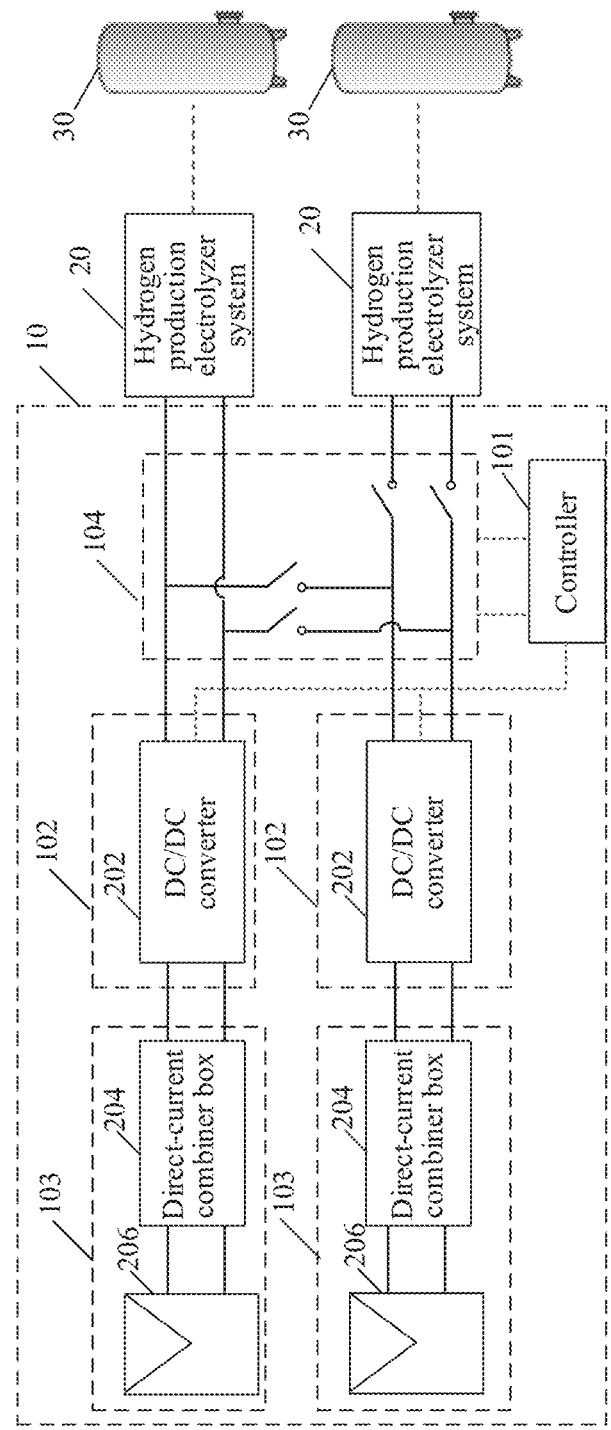
FIG. 6 is a schematic diagram illustrating the direct-current coupling hydrogen production system according to another embodiment of the present disclosure.

(2) The hydrogen production electrolyzer system 20 discharges hydrogen at its cathode, the gas pipeline is a non-metal pipeline, and the hydrogen is stored in the centralized or decentralized manner, or the hydrogen production electrolyzer system 20 discharges hydrogen at its immediate electrode, the gas pipeline is a metal pipeline or non-metallic pipeline, and the hydrogen is stored in the centralized or decentralized manner, as shown in FIG. 5 (which illustrates an example in which the hydrogen is stored in the centralized manner) and FIG. 6 (which illustrates an example in which the hydrogen is stored in the decentralized manner). Each electrolyzer input switch module 32 in the power switching unit 104 shown in FIG. 3 includes a controllable switch arranged on a branch of an anode and a controllable switch arranged on a branch of a cathode. Each bus switch module 33 in the power switching unit 104 shown in FIG. 3 includes a controllable switch arranged on a positive branch of the collection bus and a controllable switch arranged on a negative branch of the collection bus. In this case, cathodes at input ends of all the hydrogen production electrolyzer systems 20 are not equipotential. It should be noted that, FIGS. 5 and 6 each illustrate on an only example in which the renewable energy system 103 includes a solar power system only, the number of the renewable energy systems 103 is two, and the conversion system 102 is arranged at the front end of the power switching unit 104.

It should be noted that in a case that the direct-current coupling hydrogen production system discharges hydrogen in another manner, the gas pipeline is made of another material, and the hydrogen is stored in another manner in additional to the cases illustrated in (1) or (2), each of the electrolyzer input switch modules 32 and each of the bus switch modules 33 in the direct-current coupling hydrogen production system has a structure corresponding to the current case, which are not repeated here and fall within the protection scope of the present disclosure.

The controllable switch may be a controllable mechanical switch such as a circuit breaker, a contactor and a relay, or a semiconductor switch such as an IGCT (intergrated gate commutated thyristors) and an IGBT (insulated gate bipolar transistors), depending on the actual applications, which is not limited herein and falls within the protection scope of the present disclosure.

In this embodiment, the power switching unit 104 includes a controllable switch specific to a manner in which the direct-current coupling hydrogen production system discharges hydrogen, a gas pipeline and a manner in which hydrogen is stored, so that electrical energy intended for a hydrogen production electrolyzer system 20 is successfully supplied to the hydrogen production electrolyzer system 20, thereby improving the energy utilization and safety of the direct-current coupling hydrogen production system.

A method for controlling a direct-current coupling hydrogen production system is provided according to an embodiment of the present disclosure. The method is applied to the controller of the direct-current coupling hydrogen production system according to any one of the above embodiments. The structure of the direct-current coupling hydrogen production system refers to the above embodiments, and thus is not repeated here.

Figure 7:
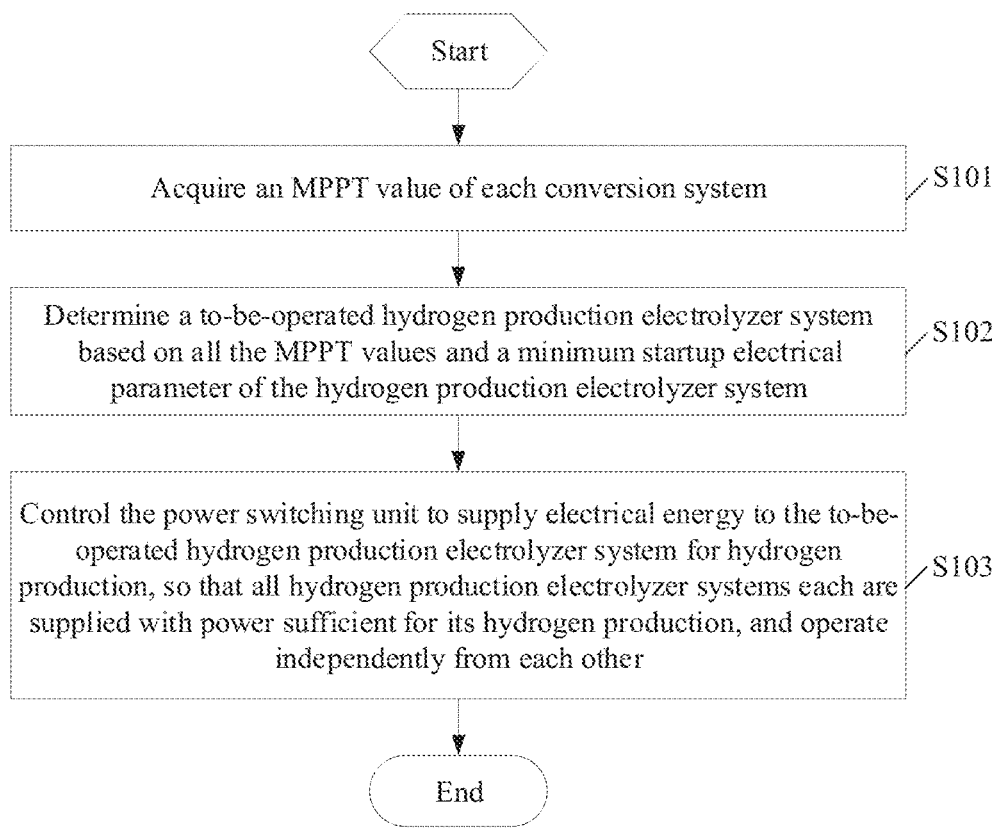
FIG. 7 is a flowchart illustrating a method for controlling the direct-current coupling hydrogen production system according to an embodiment of the present disclosure.

Referring to FIG. 7, the method for controlling a direct-current coupling hydrogen production system includes the following steps S101 to S 103.

In S101, an MPPT value of each conversion system is acquired.

In S102, a to-be-operated hydrogen production electrolyzer system is determined based on all the MPPT values and a minimum startup electrical parameter of the hydrogen production electrolyzer system.

The minimum startup electrical parameter is a minimum startup current or a minimum startup power. That is, in a case that an actual electrical parameter of the hydrogen production electrolyzer system is greater than or equal to the minimum startup electrical parameter, concentration of hydrogen produced by the hydrogen production electrolyzer system is sufficient for normal operation, and thus shutdown of the hydrogen production electrolyzer system due to low concentration of the produced hydrogen is impossible.

Step S102 is describe in detail as follows. A sum of all the MPPT values is calculated. The sum is compared with the minimum startup electrical parameter, The number of the to-be-operated hydrogen production electrolyzer system is acquired. Then, the to-be-operated hydrogen production electrolyzer system is determined randomly or in a preset order. Alternatively, the to-be-operated hydrogen production electrolyzer system is determined directly. Details in step S102 are not limited herein, and fall within the protection scope of the present disclosure.

In S103, the power switching unit is controlled to provide electrical energy for the to-be-operated hydrogen production electrolyzer system for hydrogen production, so that all hydrogen production electrolyzer systems each are supplied with power sufficient for hydrogen production, and operate independently from each other.

It should be noted that, after the above steps, the electrical energy for hydrogen production received by the hydrogen production electrolyzer system is sufficient for normal operation of the hydrogen production electrolyzer system. That is, the concentration of hydrogen produced by the hydrogen production electrolyzer system is sufficient for normal operation. As long as the power switching unit provides electrical energy for hydrogen production to the to-be-operated hydrogen production electrolyzer system, the hydrogen production electrolyzer system operates normally. There is no case of shutdown due to low concentration of the produced hydrogen.

In practice, in a case that the power switching unit includes at least M-1 electrolyzer input switch modules and at least N-1 bus switch modules, step S103 further includes: controlling a bus switch module and an electrolyzer input switch module in the power switching unit to be turned on, so that an input port is connected to an output port in the power switching unit. The to-be-operated hydrogen production electrolyzer systems operate independently from each other.

In practice, in a case that the number of the to-be-operated hydrogen production electrolyzer system is 1, all the bus switch modules and the electrolyzer input switch module that is connected to the to-be-operated hydrogen production electrolyzer system are controlled to be turned on, and all other electrolyzer input switch modules are controlled to be turned off, so that all the input ports each are connected to the output port of the power switching unit, and the to-be-operated hydrogen production electrolyzer system operates independently from each other. For example, as shown in FIG. 4, in a case that the electrical energy outputted from the electricity generation system 10 is insufficient for hydrogen production by two hydrogen production electrolyzer systems 20 and the number of the to-be-operated hydrogen production electrolyzer system 20 is determined to 1, the controllable switch S2 connected to one hydrogen production electrolyzer system 20 is controlled to be turned off, and the controllable switch S1 on the collection bus is controlled to be turned on, so that the electrical energy outputted from the two solar power systems is supplied to the same hydrogen production electrolyzer system 20 for hydrogen production.

Figure 8:
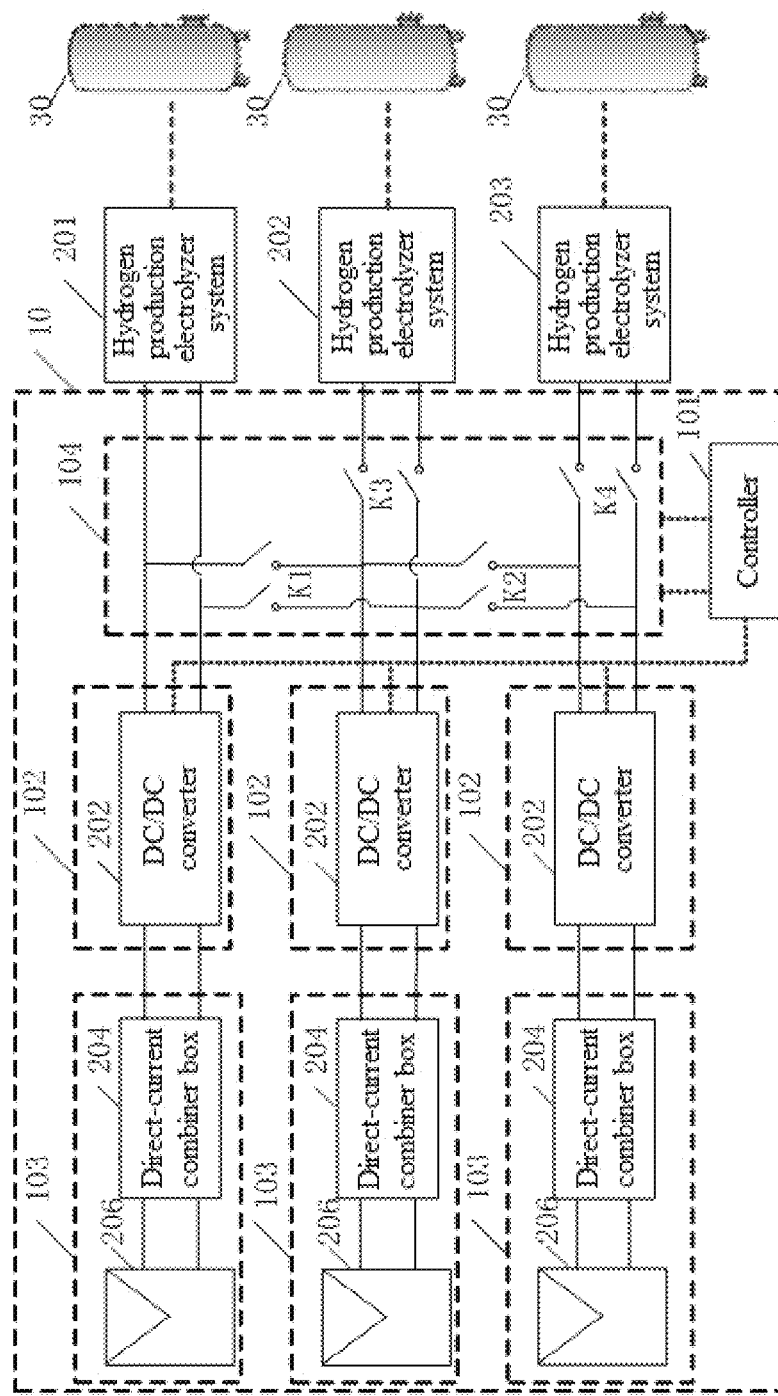
FIG. 8 is a schematic diagram illustrating the direct-current coupling hydrogen production system according to another embodiment of the present disclosure.

In a case that the number of the to-be-operated hydrogen production electrolyzer system is greater than 1, for each to-be-operated hydrogen production electrolyzer system, a bus switch module and an electrolyzer input switch module in a path for supplying power to the to-be-operated hydrogen production electrolyzer system are controlled to be turned on, and a bus switch module between paths is controlled to be turned off, so that an input port is connected to an output port of the power switching unit, and the to-be-operated hydrogen production electrolyzer systems operate independently from each other. As shown in FIG. 8, the number of the to-be-operated hydrogen production electrolyzer system is greater than 1. For example, hydrogen production electrolyzer systems 201 and 203 are determined to be operated. A bus switch module K1 is controlled to be turned on and K3 is controlled to be turned off, so that the hydrogen production electrolyzer system 201 operates. The hydrogen production electrolyzer system 202 is supplied with no electrical energy and thus fails to operate. A bus switch module K4 is controlled to be turned on, so that the hydrogen production electrolyzer system 201 operates. Further, a bus switch module K2 is controlled to be turned off so that the hydrogen production electrolyzer systems 201 and 203 operate independently from each other, thereby preventing circulation between the hydrogen production electrolyzer systems 201 and 203.

In the above method, the to-be-operated hydrogen production electrolyzer system varies with the MPPT value. With the above method, the concentration of hydrogen produced by the hydrogen production electrolyzer system is sufficient for normal operation. Moreover, the method for controlling a direct-current coupling hydrogen production system according to this embodiment is simple in control and easy to implement, which is beneficial for popularization and use.

The features described in embodiments of the present disclosure may be replaced or combined with each other, the same or similar parts among the embodiments can be referred to each other, and each embodiment places emphasis on the difference from another embodiment. In particular, since the system or the embodiment of the system is similar to the embodiment of the method, the description of the system or the embodiment of the system is simple, and reference may be made to the relevant part of the embodiment of the method. The above system and the above embodiment of the system are only illustrative. The units described as separate components may be or may not be separated physically, and the components shown as units may be or may not be physical units, that is, the units may be located at the same position or may be distributed onto multiple network units. Some or all of the modules may be selected to implement an object of the solution in the current embodiment, depending on actual applications. Those skilled in the art may understand and implement the present disclosure without any creative effort.

It is further understood by those skilled in the art that units and algorithm steps described in combination with the disclosed embodiments may be implemented by electronic hardware, computer software or a combination thereof. In order to clearly describe interchangeability of the hardware and the software, configurations and the steps are generally described above based on functions. Determination regarding implementing the functions by the hardware or the software depends on specific applications of the technical solutions and design constraints. For each of the specific applications, those skilled in the art may adopt a specific implementation to implement the functions described above, and the implementation should fall within the scope of the present disclosure.

Based on the above description of the disclosed embodiments, those skilled in the art may implement or use the present disclosure. Those skilled in the art may easily think of various modifications to these embodiments. The general principles defined herein may be applied to other embodiments without departing from the spirit or scope of the present disclosure. Therefore, the present disclosure is defined by the widest scope consistent with the principles and novel features disclosed herein rather than limited to the embodiments illustrated herein.

The invention claimed is:

1. A direct-current coupling hydrogen production system, comprising: at least one electricity generation system and a plurality of hydrogen production electrolyzer systems, wherein
the at least one electricity generation system each comprises: a controller, N renewable energy systems, a plurality of conversion systems and a power switching unit, and N is an integer greater than 1;
the plurality of conversion systems and the power switching unit each are arranged on an electrical energy transmission path from the N renewable energy systems to M hydrogen production electrolyzer systems, and M is an integer greater than 1;
the power switching unit comprises N input ports and M output ports; and
the controller is configured to:
acquire a maximum power point tracking MPPT value of each of the conversion systems;
determine a to-be-operated hydrogen production electrolyzer system among the M hydrogen production electrolyzer systems based on all the MPPT values and a minimum startup electrical parameter of a hydrogen production electrolyzer system; and
control the power switching unit to supply electrical energy to the to-be-operated hydrogen production electrolyzer system for hydrogen production, so that electrical energy received by each to-be-operated hydrogen production electrolyzer system is sufficient for hydrogen production, and all the to-be-operated hydrogen production electrolyzer system operates independently.

2. The direct-current coupling hydrogen production system according to claim 1, wherein in a case that the plurality of conversion systems in each of the at least one electricity generation system are arranged at a front end of the power switching unit,
the number of the plurality of conversion systems is N;
output ports of the N renewable energy systems are connected to input ports of the N conversion systems in one-to-one correspondence;
output ports of the N conversion systems are connected to the N input ports of the power switching unit in one-to-one correspondence; and the M output ports of the power switching unit are connected to input ports of the M hydrogen production electrolyzer systems in one-to-one correspondence.

3. The direct-current coupling hydrogen production system according to claim 1, wherein in a case that the plurality of conversion systems in each of the at least one electricity generation system are arranged at a back end of the power switching unit,
the number of the plurality of conversion systems is M;
output ports of the N renewable energy systems are connected to the N input ports of the power switching unit in one-to-one correspondence;
the M output ports of the power switching unit are connected to input ports of the M conversion systems in one-to-one correspondence; and
output ports of the M conversion systems are connected to input ports of the M hydrogen production electrolyzer systems in one-to-one correspondence.

4. The direct-current coupling hydrogen production system according to claim 1, further comprising:
at least one hydrogen storage tank configured to store hydrogen produced by the plurality of hydrogen production electrolyzer systems.

5. The direct-current coupling hydrogen production system according to claim 4, wherein
the plurality of hydrogen production electrolyzer systems each are configured to discharge hydrogen at a cathode or an intermediate electrode of the hydrogen production electrolyzer system; and
a gas pipeline between the hydrogen storage tank and each of the plurality of hydrogen production electrolyzer systems is a metal pipeline or a non-metallic pipeline.

6. The direct-current coupling hydrogen production system according to claim 4, wherein
the number of the hydrogen storage tank is one, and the plurality of hydrogen production electrolyzer systems are configured to share the one hydrogen storage tank to store hydrogen in a centralized manner; or
the number of the hydrogen storage tank is M, the plurality of hydrogen production electrolyzer systems correspond to the M hydrogen storage tanks in one to one correspondence, to store hydrogen in a distributed manner; or
the number of the hydrogen storage tank is greater than 1 and less than M, some of the plurality of hydrogen production electrolyzer systems are configured to share a same hydrogen storage tank, wherein hydrogen produced by a hydrogen production electrolyzer system among the plurality of hydrogen production electrolyzer systems that is connected to one hydrogen storage tank is stored separately from hydrogen produced by a hydrogen production electrolyzer system among the plurality of hydrogen production electrolyzer systems that is connected to another hydrogen storage tank.

7. The direct-current coupling hydrogen production system according to claim 1, wherein
the power switching unit comprises at least N-1 bus switch modules and at least M-1 electrolyzer input switch modules;
one port of each of the M-1 electrolyzer input switch modules is connected to an output port among the M output ports of the power switching unit, and the other port of the electrolyzer input switch module is connected to an input port among the N input ports of the power switching unit; and
each of the bus switch modules is arranged between two input ports among the N input ports of the power switching unit.

8. The direct-current coupling hydrogen production system according to claim 7, wherein
in a case that hydrogen is discharged at a cathode, a gas pipeline is a metal pipeline, and hydrogen is stored in a centralized manner, each of the M-1 electrolyzer input switch modules comprises a controllable switch arranged on an anode branch, and each of the N-1 bus switch modules comprises a controllable switch arranged on a positive branch; and
in a case that hydrogen is discharged at a cathode and a gas pipeline is a non-metal pipeline, or hydrogen is discharged at an immediate electrode, each of the M-1 electrolyzer input switch modules comprises a controllable switch arranged on anode branch and a controllable switch arranged on a cathode branch, and each of the N-1 bus switch modules comprises a controllable switch arranged on a positive branch and a controllable switch arranged on a negative branch.

9. The direct-current coupling hydrogen production system according to claim 8, wherein the controllable switch is a controllable mechanical switch or a semiconductor switch.

10. The direct-current coupling hydrogen production system according to claim 1, wherein for each of the N renewable energy systems,
the renewable energy system comprises: a wind power system and/or a solar power system;
in a case that the renewable energy system comprises the wind power system, a conversion system among the plurality of conversion systems that corresponds to the renewable energy system comprises an AC/DC converter connected to the wind power system; and
in a case that the renewable energy system comprises the solar power system, a conversion system among the plurality of conversion systems that corresponds to the renewable energy system comprises a DC/DC converter connected to the solar power system.

11. The direct-current coupling hydrogen production system according to claim 10, wherein
the solar power system comprises a photovoltaic module and a direct-current combiner box, one port of the direct-current combiner box is connected to an output port of the photovoltaic module, and the other port of the direct-current combiner box serves as an output port of the solar power system; and
the wind power system comprises a blade and a permanent magnet synchronous generator or doubly fed induction generator, a port of the permanent magnet synchronous generator or doubly fed induction generator serves as an output port of the wind power system.

12. The direct-current coupling hydrogen production system according to claim 1, wherein
the controller is a communication host in each of the plurality of conversion systems; or
the controller is a system controller independently arranged in the direct-current coupling hydrogen production system.

13. A method for controlling a direct-current coupling hydrogen production system, wherein the direct-current coupling hydrogen production system comprises at least one electricity generation system and a plurality of hydrogen production electrolyzer systems; the at least one electricity generation system each comprises: a controller, N renewable energy systems, a plurality of conversion systems and a power switching unit, and N is an integer greater than 1; the plurality of conversion systems and the power switching unit each are arranged on an electrical energy transmission path from the N renewable energy systems to M hydrogen production electrolyzer systems, and M is an integer greater than 1; the power switching unit comprises N input ports and M output ports; and the method comprises:

acquiring a maximum power point tracking MPPT value of each conversion system in the direct-current coupling hydrogen production system;

determining a to-be-operated hydrogen production electrolyzer system based on all the MPPT values and a minimum startup electrical parameter of a hydrogen production electrolyzer system in the direct-current coupling hydrogen production system; and controlling the power switching unit in the direct-current coupling hydrogen production system to supply electrical energy to the to-be-operated hydrogen production electrolyzer system for hydrogen production, so that electrical energy received by each to-be-operated hydrogen production electrolyzer system is sufficient for hydrogen production, and all the to-be-operated hydrogen production electrolyzer system operates independently.

14. The method for controlling a direct-current coupling hydrogen production system according to claim 13, wherein the power switching unit comprises at least M-1 electrolyzer input switch modules and at least N-1 bus switch modules; and wherein the controlling the power switching unit in the direct-current coupling hydrogen production system to supply electrical energy to the to-be-operated hydrogen production electrolyzer system for hydrogen production, so that electrical energy received by each to-be-operated hydrogen production electrolyzer system is sufficient for hydrogen production, and all the to-be-operated hydrogen production electrolyzer system operates independently comprises:

controlling a bus switch module and an electrolyzer input switch module in the power switching unit to be turned on to connect an input port to an output port of the power switching unit so that all the to-be-operated hydrogen production electrolyzer system operates independently.

15. The method for controlling a direct-current coupling hydrogen production system according to claim 14, wherein the controlling a bus switch module and an electrolyzer input switch module in the power switching unit to be turned on to connect an input port to an output port of the power switching unit so that all the to-be-operated hydrogen production electrolyzer system operates independently comprises:

controlling, in a case that the number of the to-be-operated hydrogen production electrolyzer system is 1, all bus switch modules and an electrolyzer input switch module that is connected to the to-be-operated hydrogen production electrolyzer system to be turned on, and all other electrolyzer input switch modules to be turned off, so that all input ports of the power switching unit each are connected to the output port of the power switching unit, and the to-be-operated hydrogen production electrolyzer system operates independently; and controlling, for each to-be-operated hydrogen production electrolyzer system in a case that the number of the to-be-operated hydrogen production electrolyzer system is greater than 1, a bus switch module and an electrolyzer input switch module in a path for supplying electrical energy to the to-be-operated hydrogen production electrolyzer system to be turned on, and a bus switch module between paths to be turned off, so that an input port is connected to an output port of the power switching unit, and the to-be-operated hydrogen production electrolyzer systems operate independently from each other.

\* \* \* \* \*